(12) United States Patent
Meunier et al.

(10) Patent No.: US 12,185,724 B2
(45) Date of Patent: Jan. 7, 2025

(54) ABAMECTIN SOLUBLE CONCENTRATE COMPOSITION (SL)

(71) Applicant: SYNGENTA PARTICIPATIONS AG, Basel (CH)

(72) Inventors: Celine Meunier, Münchwilen (CH); Susan Waehrer-Eggs, Münchwilen (CH); Hildegard Schneider, Münchwilen (CH); Kerstin Garo, Münchwilen (CH); Marion Janker, Münchwilen (CH)

(73) Assignee: SYNGENTA CROP PROTECTION AG, Basel (CH)

( * ) Notice: Subject to any disclaimer, the term of this patent is extended or adjusted under 35 U.S.C. 154(b) by 878 days.

(21) Appl. No.: 17/287,219

(22) PCT Filed: Oct. 22, 2019

(86) PCT No.: PCT/EP2019/078749
§ 371 (c)(1),
(2) Date: Apr. 21, 2021

(87) PCT Pub. No.: WO2020/083925
PCT Pub. Date: Apr. 30, 2020

(65) Prior Publication Data
US 2021/0378243 A1 Dec. 9, 2021

(30) Foreign Application Priority Data
Oct. 24, 2018 (EP) ..................... 18202400

(51) Int. Cl.
*A01N 43/90* (2006.01)
*A01N 25/02* (2006.01)

(52) U.S. Cl.
CPC ............. *A01N 43/90* (2013.01); *A01N 25/02* (2013.01)

(58) Field of Classification Search
None
See application file for complete search history.

(56) References Cited

U.S. PATENT DOCUMENTS

| 9,114,167 B2 | 8/2015 | Strobel |
| 9,770,021 B2 | 9/2017 | Keiper et al. |
| 1,135,113 A1 | 6/2022 | Hustvedt et al. |
| 2006/0293260 A1 | 12/2006 | Albright |
| 2010/0093652 A1 | 4/2010 | Spring et al. |
| 2011/0009350 A1 | 1/2011 | Pedersen et al. |
| 2015/0289507 A1 | 10/2015 | Munoz Santiago |
| 2017/0354142 A1 * | 12/2017 | Keiper .................. A01N 25/30 |
| 2017/0360029 A1 | 12/2017 | Kawada |

FOREIGN PATENT DOCUMENTS

| CN | 101606517 A | 12/2009 |
| CN | 101790978 A | 8/2010 |
| CN | 105145553 A | 12/2015 |
| CN | 102067848 A | 12/2017 |
| JP | 2009-515912 A | 4/2009 |
| JP | 2012-507545 A | 3/2012 |
| JP | 2012-527403 A | 11/2012 |
| JP | 2014-43431 A | 3/2014 |
| JP | 2015-28028 A | 2/2015 |
| JP | 2016-510018 A | 4/2016 |
| TW | 200718360 A | 5/2007 |
| WO | 2013/054194 A1 | 4/2013 |
| WO | WO-2019126922 A1 * | 7/2019 ............ A01N 25/04 |

OTHER PUBLICATIONS

Written Opinion of the International Searching Authority and International Search Report for International Application No. PCT/EP2019/078749 mailed Jan. 8, 2020.
Ali, "Surface Properties of Mixed Adsorbed Surfactants Film of Tween 20 and Tween 80 on Liquid—Air Interfacial", International Journal of Science and Research, 6(7), pp. 936-939, 2017.

* cited by examiner

*Primary Examiner* — Traviss C McIntosh, III
(74) *Attorney, Agent, or Firm* — BakerHostetler; Toni-Junell Herbert

(57) ABSTRACT

The present invention relates to soluble concentrate compositions useful in agriculture to control pests harmful to commercial crops, including ornamental plants, comprising (i) abamectin; (ii) polyoxyethylene (20) sorbitan monolaurate; (iii) polyoxyethylene (20) sorbitan monooleate; wherein the weight ratio of polyoxyethylene (20) sorbitan monolaurate to polyoxyethylene (20) sorbitan monooleate is from 1:2.5 to 15:1.

13 Claims, 2 Drawing Sheets

ABAMECTIN SOLUBLE CONCENTRATE COMPOSITION (SL)

CROSS-REFERENCE TO RELATED APPLICATIONS

Figure 1:
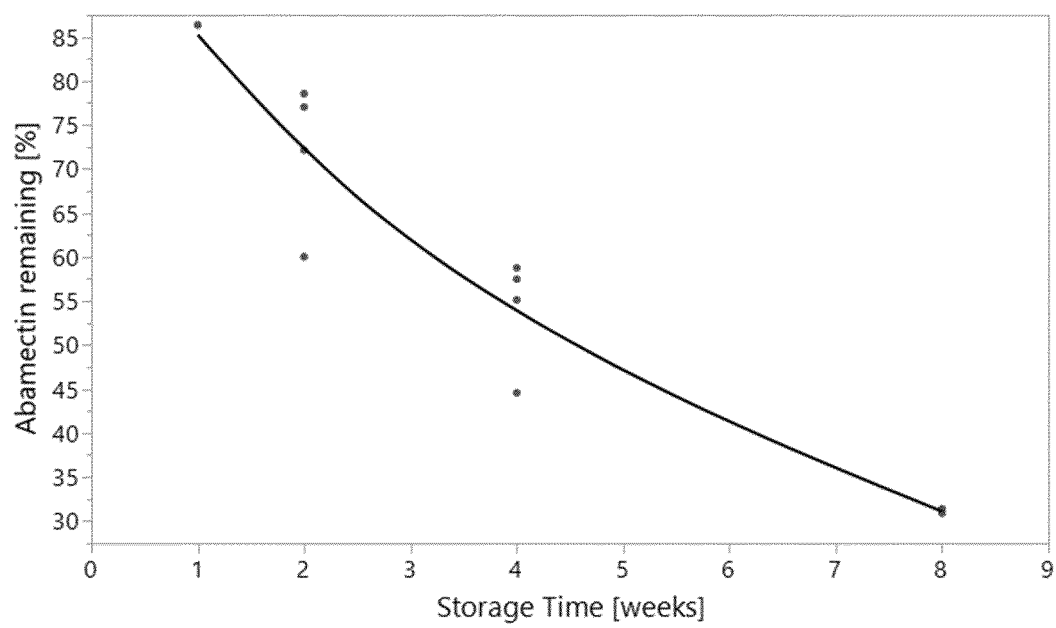

This application is a 371 National Stage application of International Application No. PCT/EP2019/078749 filed Oct. 22, 2019, which claims priority to EP 18202400.0, filed Oct. 24, 2018, the entire contents of these applications are hereby incorporated by reference.

TECHNICAL FIELD

The present invention relates to a new abamectin soluble concentrate composition (SL). Such a formulation compositions find use in agriculture to control pests harmful to commercial crops, including ornamental plants.

BACKGROUND

Insecticides are applied to crop foliage in order to protect the leaves, fruit or flowers from damage caused by insect pests. The application is usually carried out by spraying the crop with the insecticide in a carrier liquid, which is often water, but can also be an organic liquid such as diesel. The carrier liquid evaporates and leaves spray deposits behind on the plant foliage, which consist of the insecticide and other non-volatile components from the formulation.

It is well-established that the efficacy of an insecticide is improved when it exists in the spray deposit in a dissolved or amorphous form and not as crystals such that the insecticide molecules can diffuse more freely through the external cuticles of the leaf and insect pests. Faster penetration of the insecticide into the leaf is an advantage when it is required that the insecticide be active against insects living inside the leaf such as the larvae of leaf miners or when the insecticide should be available on the underside of the leaf such as during an infestation with red spider mites. Faster penetration of the insecticide into insect tissues is also an advantage leading to better control of pests with a lower overall insecticide concentration, i.e. the amount of active ingredient can be reduced.

Abamectin has intrinsic activity against several pests, such as thrips, mites and leafminers species among other insects. It is known that abamectin exhibits a translaminar movement but only a small % of abamectin enters the leaf. Abamectin that does not enter the leaf is photo-degraded after a short period of time. Thus, there is a need to design new formulations of abamectin which enable more active ingredient to enter the leaf.

Abamectin is a crystalline solid with a melting point of 162-169° C. and a water solubility of 1.2 parts per million ("The Pesticide Manual", 15th Ed., British Crop Protection Council, 2009). Poorly water-soluble pesticides such as abamectin may be formulated to give spray liquids in which they are dissolved. One option is to make an emulsifiable concentrate where the insecticide is dissolved in a suitable organic solvent together with surfactant. It is a disadvantage of conventional emulsifiable concentrates that high amounts of organic solvents must be used to dissolve the active ingredient, typically from 30 to 90% by weight in an emulsifiable concentrate formulation (EC) (Knowles, Chemistry and Technology of Agrochemical Formulations, Kluwer Academic Publishers, 1998). High amounts of organic solvents can be undesirable in crop protection products due to the odour, potential for increasing human skin and eye irritation or toxicity, environmental considerations and cost.

Microemulsions are another known type of agrochemical formulation for poorly water-soluble pesticides where the active ingredient is dissolved but in contrast to an emulsifiable concentrate some organic solvent is replaced by water and surfactants. Microemulsions contain typically 20 to 30% by weight of organic solvent (Narayanan & Chaudry, Pesticide Formulations and Application Systems Vol. 12, ASTM, 1993), so they still rely on organic solvents.

There remains a need to provide abamectin soluble concentrate formulations which are free of organic solvents, show long term stability of abamectin in solution, do not exhibit formulation failures such as flake formation or active ingredient degradation during storage and lead to improved uptake of abamectin into the leave.

DESCRIPTION OF THE INVENTION

The formulation according to the current invention provides improved uptake of abamectin into the leave compared to commercial EC abamectin formulations and that without the addition of further adjuvants. This can be observed by a significant reduction in the amount of abamectin required to achieve the same protection in the field, i.e. a so-called rate reduction. At the same time, the formulation of the current invention is stable over a long period of time even at high storage temperatures and exhibits little degradation of abamectin. All these technical effects are achieved by the soluble concentrate (SL) formulations according to the following embodiments.

In a first aspect, as embodiment 1, the invention provides a soluble concentrate composition comprising
  (i) abamectin;
  (ii) polyoxyethylene (20) sorbitan monolaurate;
  (iii) polyoxyethylene (20) sorbitan monooleate;
  wherein the weight ratio of polyoxyethylene (20) sorbitan monolaurate to polyoxyethylene (20) sorbitan monooleate is from 1:2.5 to 15:1, preferably from 1:1.75 to 5:1.

As embodiment 2, the invention provides a soluble concentrate composition according to embodiment 1 comprising
  (i) abamectin;
  (ii) 250-750 grams/liter of the composition of polyoxyethylene (20) sorbitan monolaurate;
  (iii) 50-550 grams/liter of the composition of polyoxyethylene (20) sorbitan monooleate.

As embodiment 3, the invention provides a soluble concentrate composition according to embodiment 1 or 2 comprising
  (i) abamectin;
  (ii) 250-750 grams/liter of the composition polyoxyethylene (20) sorbitan monolaurate;
  (iii) 50-550 grams/liter of the composition of polyoxyethylene (20) sorbitan monooleate;
  (iv) 150-250 grams/liter of fatty alcohol alkoxylate.

As embodiment 4, there is provided a soluble concentrate composition according to any one of embodiments 1 to 3 comprising
(i) abamectin;
(ii) 250-350 grams/liter of the composition polyoxyethylene (20) sorbitan monolaurate;
(iii) 450-550 grams/liter of the composition of polyoxyethylene (20) sorbitan monooleate;
(iv) 150-250 grams/liter of fatty alcohol alkoxylate.

Polyoxyethylene (20) sorbitan monolaurate (commercial brand names include Montanox 20®, Polysorbate 20®, PEG(20)sorbitan Monolaurate®, Alkest TW 20® and Tween 20®) is a polysorbate-type non-ionic surfactant formed by the ethoxylation of sorbitan before the addition of lauric acid. Polyoxyethylene (20) sorbitan monooleate (commercial brand names include Montanox 80®, Alkest TW 80®, Tween 80® and Polysorbate 80®) is a polysorbate-type non-ionic surfactant formed by the ethoxylation of sorbitan before the addition of oleic acid.

As embodiment 5, the soluble concentrate composition according to any one of claims 1 to 4, wherein the pH of a 1% solution of the soluble concentrate composition in deionized water is in the range of 3 to 4.5, preferably in the range of 3.5 to 4.5.

As embodiment 6, there is provided a soluble concentrate composition according to any one of embodiments 1 to 5 comprising
(i) 10-50 grams/liter of the composition of abamectin;
(ii) 250-350 grams/liter of the composition polyoxyethylene (20) sorbitan monolaurate;
(iii) 450-550 grams/liter of the composition of polyoxyethylene (20) sorbitan monooleate;
(iv) 150-250 grams/liter of fatty alcohol alkoxylate; and
(v) a pH adjusting agent.

The term "pH adjusting agent" as used herein includes any agent capable of adjusting the pH.

As embodiment 7, there is provided a soluble concentrate composition according to any one of embodiments 1 to 6, wherein pH adjusting agent is an anionic phosphate ester.

As embodiment 7.1, there is provided a soluble concentrate composition according to embodiment 7, wherein the buffer is an anionic polyoxyethylene tridecyl phosphate ester.

As embodiment 7.2, there is provided a soluble concentrate composition according to embodiment 7 and 7.1, wherein the amount of anionic phosphate ester in the range from 5 to 25 grams/liter.

As embodiment 8, there is provided a soluble concentrate composition according to any one of embodiments 1 to 7, wherein the fatty alcohol alkoxylate is ethoxylated or propoxylated or both of them.

In a second aspect, as embodiment 9, there is provided a method for the preparation of a soluble concentrate composition according to any one of embodiments 1 to 8 comprising the step of dissolving abamectin in a solution of polyoxyethylene (20) sorbitan monolaurate, polyoxyethylene (20) sorbitan monooleate and fatty alcohol alkoxylate by heating the solution to a temperature of maximum 45° C.

As embodiment 10, there is provided a method according to embodiment 9 comprising the additional step of cooling the solution back to ambient temperature and then adding a phosphate ester.

In a third aspect, there is provided a method of reducing or preventing insect damage in a plant comprising applying a composition according to any one of embodiments 1 to 8 to the plant. In particular, the plants are selected from tomato, pepper, potato, banana, eggplant, mango, onion, watermelon, apple, pear, citrus fruit, coffee, oriental melon, cotton, soybean, cucumber, pome fruits, stone fruits, strawberry, curcurbits, melon, pumpkin, squash, cabbage, chilli, okra, papaya and tea.

More particularly, the plants are selected from curcurbits, pepper, tomato, onion, melon, pumpkin, watermelon, citrus fruit, cucumber, eggplant, oriental melon, pear, pome fruits, squash, strawberry, cabbage and chilli.

The term "compositions of the present invention", "compositions of the current inventions" or "inventive compositions" as used herein mean compositions according to any one of embodiments 1 to 8.

The following advantages of the soluble concentrate composition of the present invention have been surprisingly found:
(a) Prolonged storage stability, i.e. no occurrence of physical changes in the composition such as cloudiness, precipitation or flake building even over prolonged periods;
(b) full dissolution of the concentrate when diluted in water;
(c) excellent physical stability of the active ingredient abamectin;
(d) improved biological activity compared to standard abamectin compositions.

The improved biological activity of the soluble concentrate compositions according to the present invention is demonstrated in the biological data presented in the experimental section. In particular, when abamectin is applied to plants by using an aqueous dilution of the soluble concentrate compositions according to the present invention, then the treatment is up to double as effective as when the same amount of abamectin is applied to plants by using an aqueous dilution of the standard commercial emulsion concentrate. This means that a much smaller amount of abamectin concentrate according to the current invention is needed in practice compared to the current standard commercial abamectin concentrates in order to achieve the same insecticidal effects. This has many advantages such as for example environmentally friendlier application of abamectin, i.e. less abamectin is sprayed onto fields which is important as abamectin is highly toxic and thus needs to be handled with great care.

In a further aspect, the current invention provides a method for controlling a pest comprising diluting a composition according to any one of embodiments 1 to 8 with a suitable liquid carrier, in particular an aqueous liquid carrier, such as water or liquid fertilizer, and then applying the dilute composition to the plant propagation material, plant or locus thereof. In another particular embodiment, the dilute composition is applied by in furrow or T-band type application. The composition of the present invention may also be combined in a continuous flow apparatus with water in spray application equipment, such that no holding tank is required for the diluted product.

Other active ingredients such as herbicides, plant growth regulators, algicides, fungicides, bactericides, viricides, insecticides, acaridcdes, nematicides or molluscicides may be present in the soluble concentrate compositions of the present invention or may be added as a tank-mix partner to the dilute spray compositions prepared therefrom.

In addition, the soluble concentrate compositions of the invention may further comprise other additives. Such additives include safeners, thickeners, flow enhancers, wetting agents, antifoaming agents, biocides, buffers, chelating agents, lubricants, fillers, drift control agents, deposition enhancers, evaporation retardants, frost protecting agents, insect attracting odor agents, UV protecting agents, fragrances, and the like. These additives are known to a person skilled in the art.

The following examples illustrate further the invention but are not intended to limit its scope.

EXPERIMENTAL (A) Storage Stability of Abamectin Formulations:

TABLE 1

| Formulation | A | B | C | D |
|---|---|---|---|---|
| Component | g/L | g/L | g/L | g/L |
| Abamectin | 18 | 18 | 18 | 18 |
| AFO1 | 1 | | | |
| AFO2 | 0.1 | | | |
| AFO3 | | 0.3 | | |
| AFO4 | | | 3 | |
| AFO5 | | | | 5 |
| fatty alcohol alkoxyate | 180 | 180 | 180 | 180 |
| polyoxyethylene (20) sorbitan monooleate | Rest | Rest | Rest | Rest |
| Aspect after 2 weeks at 54° C. | Cloudy | Clear | Slightly flaky with precipitates | Clear |
| Aspect after 1 month at 54° C. | Cloudy | Small flakes | Slightly flaky with precipitates | Small flakes |
| Aspect after 3 months at room temperature | Cloudy | Slightly cloudy | Clear | Clear |
| Aspect after 3 months at 54° C. | Cloudy | Small precipitates | Isolated flakes | One flake | g/L = grams/liter

Table 1 shows that Abamectin formulations A-D are not stable under storage conditions. The formulations show failures like cloudiness and precipitates which are not acceptable for commercial formulations.

Antifoams Used (Trade Names):

| AFO1 | RMAS 30 |
|---|---|
| AFO2 | Antifoam MSA |
| AFO3 | SAG 1572 |
| AFO4 | Silex SE-2 |
| AFO5 | Silwet L-7002 |

(B) Dissolution of the Formulation:

The formulations E-J were diluted with water in cylinders. The cylinders were inverted 30 times and the dilutions checked for remains at the bottom.

TABLE 2

| Formulation | E | F | G | H | I | J |
|---|---|---|---|---|---|---|
| Component | g/L | g/L | g/L | g/L | g/L | g/L |
| Abamectin | 18 | 18 | 18 | 18 | 18 | 18 |
| Silicone antifoam emulsion | 0.3 | 0.3 | 0.3 | 0.3 | 0.5 | 0.5 |
| fatty alcohol alkoxyate | 180 | 180 | 180 | 180 | 180 | 180 |
| polyoxyethylene (20) sorbitan monolaurate and polyoxyethylene (20) sorbitan monooleate | Rest | Rest | Rest | Rest | Rest | Rest |
| Ratio of polyoxyethylene (20) sorbitan monolaurate to polyoxyethylene (20) sorbitan monooleate | 1:7 | 1:3 | 1:1.7 | 1:1 | 1.7:1 | 15:1 |
| Behavior in water | Not dissolved | Not dissolved | Dissolved | Dissolved | Dissolved | Dissolved | g/L = grams/liter

Table 2 shows that the dissolution of the formulation in water is highly sensitive to the amounts and type of surfactants.

(C) Stability of Abamectin:

FIG. 1:

FIG. 1 shows the amount of abamectin remaining after storing samples for 4 weeks at 54° C. Formulations with a similar composition as Formulation G in Table 2 were used. The amount of abamectin remaining in the formulations was calculated as follows:

100% (reference value) represents the mean of the starting value as well as all cold stored reference samples that are run alongside the hot stored samples as an analytical reference at each timepoint for one batch. The amount of abamectin remaining was calculated at the end of the tests as follows:

Measurement of the abamectin content/Average reference value*100%.

FIG. 1 shows clearly that abamectin degrades under storage conditions in formulations.

Table 3 shows that abamectin degrades under storage conditions unless the pH is in the range of 3 to 4.5.

Figure 2:
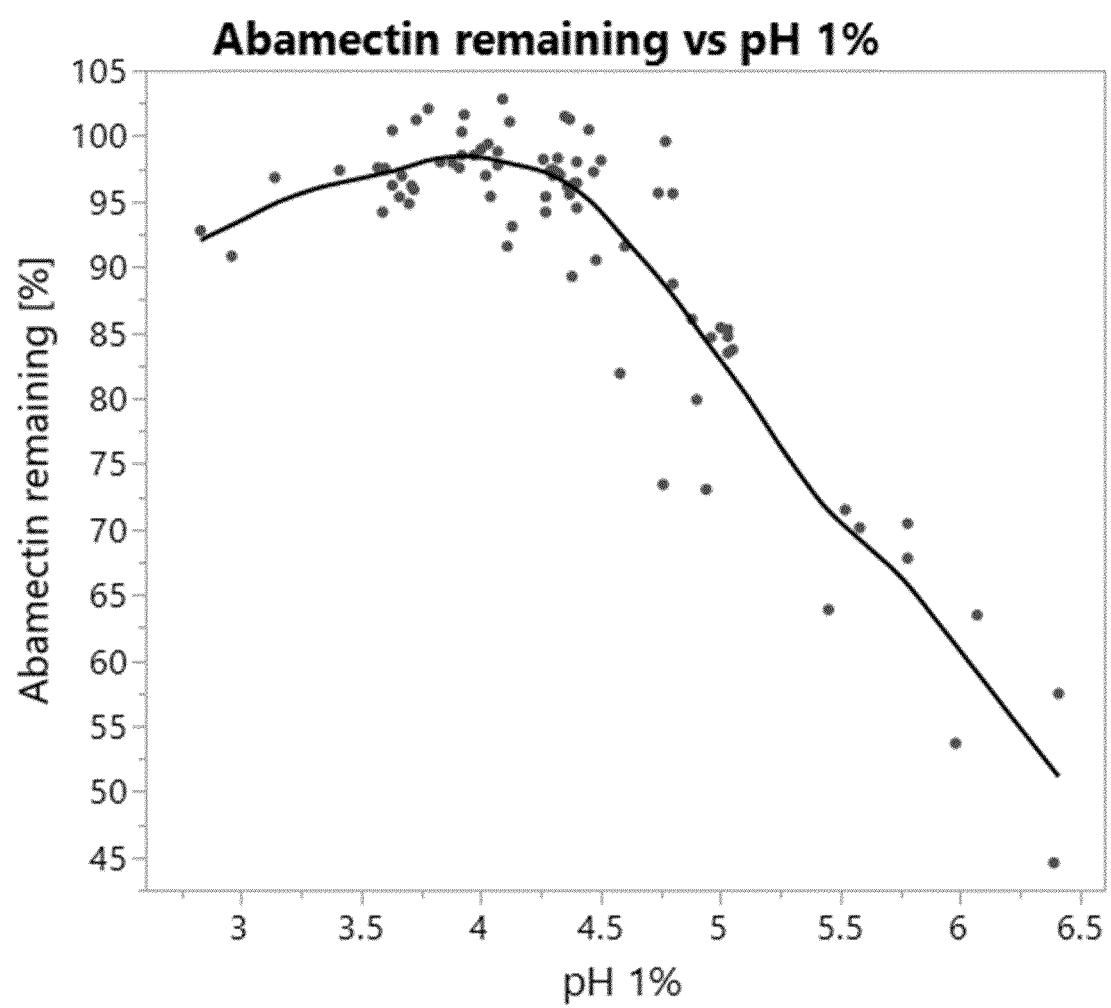

FIG. 2:

FIG. 2 shows the amount of abamectin remaining after storing the samples for 4 weeks at 54° C. Formulations with a similar composition as Formulation K in Table 3 were used. The pH of the formulation at a 1% dilution with deionized water was varied from below 3 to 6.5 using various amounts of polyoxyethylene tridecyl phosphate ester. The amount of abamectin remaining in the formulations was calculated as follows:

100% (reference value) represents the mean of the starting value as well as all cold stored reference samples that are run alongside the hot stored samples as an analytical reference at each timepoint for one batch. The amount of abamectin remaining was calculated at the end of the tests as follows:

Measurement of the abamectin content/Average reference value*100%.

TABLE 3

| Formulation | K | L | M | N | O | P |
|---|---|---|---|---|---|---|
| Component | g/L | g/L | g/L | g/L | g/L | g/L |
| Abamectin | 18 | 18 | 18 | 18 | 18 | 18 |
| Silicone antifoam emulsion | 0.2 | 0.2 | 0.2 | 0.2 | 0.2 | 0.2 |
| fatty alcohol alkoxylate | 180 | 180 | 180 | 180 | 180 | 180 |
| Citric acid | — | 3 | — | — | — | — |
| polyoxyethylene tridecyl phosphate ester | | | 2.5 | | 10 | |
| Lactic acid 50% | — | — | — | 3 | — | — |
| Phosphoric acid 85% | — | — | — | — | — | 3.5 |
| polyoxyethylene (20) sorbitan monolaurate and polyoxyethylene (20) sorbitan monooleate | Rest | Rest | Rest | Rest | Rest | Rest |
| Ratio of polyoxyethylene (20) sorbitan monolaurate to polyoxyethylene (20) sorbitan monooleate | 1:7 | 1:7 | 1:7 | 1:7 | 1:7 | 1:7 |
| pH (1% in deionized water) | 6.3 | 4.1 | 6.1 | 4.3 | 4.1 | 4.1 |
| AI degradation (%) | | | | | | |
| After 2 weeks at 54° C. | 30 | N.d. | 14 | N.d. | 3 | 0 |
| After 1 month at 54° C. | 45 | 2 | 32 | 5 | 7 | 3.5 |
| After 2 months at 54° C. | 70 | 2 | 44 | 9 | N.d. | N.d. |
| After 3 months at 45° C. | N.d. | N.d. | N.d. | N.d. | 7 | N.d. |
| Physical aspects upon storage | Clear solution | Crystal growth after 1 month at 54° | Clear solution | Flakes formation after 1 month at 54° C. | Clear solution | Flakes formation and turbidity observed after 1 month | g/L = grams/liter

N.d.: not determined

FIG. 2 shows clearly that abamectin degrades under storage conditions unless the pH of a 1% dilution of the formulation is kept in the range of 3 to 4.5, preferably 3.5 to 4.5.

(D) Preparation of Abamectin Soluble Concentrate Formulations According to the Inventions:

1. Charge polyoxyethylene (20) sorbitan monooleate to vessel.
2. Charge polyoxyethylene (20) sorbitan monolaurate to vessel.
3. Charge fatty alcohol alkoxyate to vessel.
4. Charge abamectin.
5. Heating under stirring to a maximum of 45° C. until complete dissolution of abamectin.
6. Temperature slowly cooled to room temperature.
7. Charge polyoxyethylene tridecyl phosphate ester.
8. Charge antifoam.
9. Filtration if needed.

Biological Data:

Field efficacy trials in several crops against key target insects comparing the inventive Abamectin soluble concentrate (ABA SL) against the commercial standard Abamectin emulsion concentrate (ABA EC). Both ABA SL and ABA EC had a concentration of 18 grams/liter.

The following examples show that new formulated ABAM SL can provide similar level of control on the target pest using between 25 and 50% less active ingredient than ABA EC. This applies for the following crops: pome fruits, stone fruits, mango trees and citrus trees among other fruit trees, for field and greenhouse vegetables, for cotton and tea. Insect pests where the dose rate reduction has been observed: mites (e.g. *Tetranychus* spp., *Panonychus* spp., broad mites, rust mites), dipteran leafminers (e.g. *Liriomyza trifolii* and other *Liriomyza* spp.), thrips (e.g. *Frankliniella occidentalis*, *Thrips palmi*, *Thrips tabaci*, *Scirtothrips* spp.) and psyllids.

Example 1. Efficacy Field Trial Against *Liriomyza trifolii* Leafminers in Okra Open Field Okra plants variety MH 179 were planted in a field in Coimbatore, India, and were naturally infested by *Liriomyza trifolii*. Field was divided in plots of 20 m$^2$ (45 cm row spacing and 30 cm within row) with 3 replicates per treatment. Trial design was completely randomized. Two foliar applications were made, first when okra was at the vegetative stage of BBCH 14-15 and the second application was done 7 days later at BBCH 15-16. Water volume spray was 350 L/ha. There were ten treatments in total: 1) water sprayed check, 2) ABA EC at 0.27 g ai/hl, 3) ABA EC at 0.54 g ai/hl, 4) ABA EC at 1.08 g ai/hl, 5) ABA EC at 1.8 g ai/hl, 6) ABA SL at 0.135 g ai/hl, 7) ABA SL at 0.27 g ai/hl, 8) ABA SL at 0.54 g ai/hl, 9) ABA SL at 1.08 g ai/hl and 10) ABA SL at 1.8 g ai/hl. Level of efficacy of each treatment was assessed counting the damage on plants (assessing numbers of mines made by *Liriomyza trifolii*). Abbott's formula was used to transform the numbers of plants with mines into % Ctrl (Ctrl=control) of mines. Assessments were done at different days after application (DAA): 3DAA1 (3 days after application), 7DAA1 (7 days after application), 3DAA2, 7DAA2, 10DAA2 (10 days after application), 15DAA2 (15 days after application) and 20DAA2 (20 days after application). Statistical analysis was done using ANOVA and the Least Significant Difference (LSD) test by Fisher.

g=gram
ai=active ingredient
hl=hectoliter=100 liter
L=liter
ha=hectare

Abbot's formula: Corrected % of control=((1−(insect population in treated plot/insect population in untreated plot))*100.

The BBCH-scale is a scale used to identify the phenological development stages of a plant. BBCH officially stands for "Biologische Bundesanstalt, Bundessortenamt and CHemische Industrie".

Results

ABA SL formulation had an improved efficacy (% Ctrl of mines) when it was compared to the ABA EC formulation at the same dose rate. Results show ABA SL at 0.54 g ai/hl achieved the same level of control on damage on plants than 1.08 gai/hl of ABA EC. This means that ABA SL provided 50% dose rate reduction compared with the commercial standard ABA EC. The results are shown in Table 4.

TABLE 4

% Ctrl on mines of *Liriomyza trifolii* leafminers in okra open field

| Formulation | Component Rate(s) g of ABA/hl | 3DAA1 | 7DAA1 | 3DAA2 | 7DAA2 | 10DAA2 | 15DAA2 | 20DAA2 | Average |
|---|---|---|---|---|---|---|---|---|---|
| EC (commercial standard) | 0.27 | 62 | 70 | 65 | 63 | 67 | 63 | 63 | 65 |
|  | 0.54 | 75 | 76 | 76 | 74 | 76 | 69 | 69 | 74 |
|  | 1.08 | 88 | 93 | 93 | 94 | 92 | 84 | 79 | 89 |
|  | 1.8 | 92 | 83 | 95 | 97 | 94 | 88 | 83 | 91 |
| SL | 0.135 | 56 | 73 | 72 | 68 | 71 | 66 | 62 | 67 |
|  | 0.27 | 65 | 76 | 78 | 75 | 79 | 78 | 76 | 76 |
|  | 0.54 | 85 | 90 | 91 | 92 | 90 | 85 | 82 | 88 |
|  | 1.08 | 94 | 97 | 96 | 97 | 94 | 90 | 88 | 94 |
|  | 1.8 | 96 | 98 | 97 | 97 | 94 | 90 | 89 | 95 |
| Average number of insects in untreated plot |  | 5.2 | 13.5 | 19.8 | 31.4 | 38.5 | 43.6 | 61.1 |  |

ABA = abamectin
hl = hectoliter = 100 liter
DAA = days after application
% Ctrl = % of control, calculated using Abbot's formula.
SL = ABA SL as given for formulation O in Table 3.

Example 2. Efficacy Field Trial Against *Scirtothrips dorsalis* in Chili Open Field Chili variety Namdhari 1701 were planted in a field in Gujarat, India, and were naturally infested by *Scirtothrips dorsalis*. Field was divided in plots of 20 m² (90 cm row spacing and 80 cm within row) with 3 replicates per treatment. Trial design was completely randomized. Two foliar applications were made, first when chili was at the vegetative stage of BBCH 24-24 and the second application was done 15 days later at BBCH 27-27.

Water volume spray was 250 L/ha for the 1$^{st}$ application and 335 L/ha for the 2$^{nd}$ application. There were ten treatments in total: 1) water sprayed check, 2) ABA EC at 0.675 g ai/hl, 3) ABA EC at 1.35 gai/hl, 4) ABA EC at 2.1 g ai/hl, 5) ABA EC at 2.7 g ai/hl, 6) ABA SL at 0.3375 g ai/hl, 7) ABA SL at 0.675 g ai/hl, 8) ABA SL at 1.35 g ai/hl, 9) ABA SL at 2.1 g ai/hl and 10) ABA SL at 2.7 g ai/hl. Level of efficacy of each treatment was assessed counting the number of mobile stages of *Scirtothrips* on leaves (sample size: 25 leaves per plot). Abbott's formula was used to transform the numbers of mobile stages per plant into % Ctrl of mobile stages per plant. Assessments were done at different days after application (DAA): 3DAA1, 7DAA1, 10DAA1, 15DAA1, 5DAA2, 10DAA2, 15DAA2 and 20DAA2. Statistical analysis was done using ANOVA and the Least Significant Difference (LSD) test by Fisher.

Abbot's formula: Corrected % of control=((1−(insect population in treated plot/insect population in untreated plot))*100.

The BBCH-scale is a scale used to identify the phenological development stages of a plant. BBCH officially stands for "Biologische Bundesanstalt, Bundessortenamt and CHemische Industrie".

Results

ABA SL formulation has an improved efficacy (% Ctrl of mobile insect stages) when it's compared to the EC formulation at the same dose rate. Results show ABA SL at 2.1 g ai/hl achieved same level of control on damage on plants than 1.35 g ai/hl of ABA EC. ABA SL provided 35% dose rate reduction of ABA EC. The results are shown in Table 5.

Example 3. Efficacy Field Trial Against *Tetranychus urticae* in Papaya Open Field Papaya plants were planted in a field in Taiwan and were naturally infested by *Tetranychus urticae*. Papaya plants were distributed in rows (40 cm row spacing and 120 cm within row) with 3 replicates per treatment. Trial design was completely randomized. One foliar application was made when papaya plants were at the vegetative stage of BBCH 24-24.

Water volume spray was 333 L/ha. There were nine treatments in total: 1) water-sprayed check, 2) ABA EC at 0.54 gai/hl, 3) ABA EC at 1.08 g ai/hl, 4) ABA EC at 1.8 gai/hl, 5) ABA SL at 0.27 g ai/hl, 6) ABA SL at 0.54 g ai/hl, 7) ABA SL at 0.81 g ai/hl, 8) ABA SL at 1.08 gai/hl and 9) ABA SL at 1.8 g ai/hl. Level of efficacy of each treatment was assessed counting the number of mobile stages of *Tetranychus urticae* on leaves (sample size: 5 leaves per plot). Abbott's formula was used to transform the number of mobile insect stages into % Ctrl of mobile insect stages. Assessments were done at different days after application (DAA): 5DAA1, 10DAA1, 14DAA1 and 21DAA2. Statistical analysis was done using ANOVA and the Least Significant Difference (LSD) test by Fisher. With the LSD test, treatments with no letter in common are significantly different at the 5% probability level.

Abbot's formula: Corrected % of control=((1−(insect population in treated plot/insect population in untreated plot))*100.

The BBCH-scale is a scale used to identify the phenological development stages of a plant. BBCH officially stands for "Biologische Bundesanstalt, Bundessortenamt and CHemische Industrie".

Results

ABAM SL formulation has an improved efficacy (% Ctrl of mobile insect stages) when it's compared to the EC formulation at the same dose rate. Results show ABA SL at 0.54 gai/hl achieved same level of control on damage on plants than 1.08 gai/hl of ABA EC. ABA SL provided 50% dose rate reduction of ABA EC. The results are shown in Table 6.

TABLE 5

% Ctrl of mobile stages of *Scirtothrips dorsalis* in chili open field.

| Formulation | Component Rate(s) g of ABA/hl | 3DAA1 | 7DAA1 | 10DAA1 | 15DAA1 | 5DAA2 | 10DAA2 | 15DAA2 | 20DAA2 | Average |
|---|---|---|---|---|---|---|---|---|---|---|
| EC (commercial standard) | 0.675 | 66 | 73 | 72 | 76 | 78 | 71 | 60 | 53 | 69 |
|  | 1.35 | 75 | 78 | 80 | 79 | 83 | 77 | 72 | 59 | 76 |
|  | 2.1 | 86 | 83 | 83 | 80 | 84 | 82 | 72 | 61 | 79 |
|  | 2.7 | 89 | 84 | 85 | 82 | 85 | 84 | 75 | 69 | 82 |
| SL | 0.3375 | 77 | 76 | 70 | 74 | 80 | 73 | 75 | 64 | 74 |
|  | 0.675 | 81 | 84 | 77 | 80 | 82 | 84 | 77 | 70 | 80 |
|  | 1.35 | 85 | 85 | 81 | 84 | 85 | 85 | 77 | 72 | 82 |
|  | 2.1 | 89 | 87 | 85 | 87 | 86 | 88 | 84 | 81 | 86 |
|  | 2.7 | 89 | 89 | 89 | 88 | 90 | 90 | 86 | 83 | 88 |
| Average number of insects in untreated plot |  | 46.7 | 47.7 | 38.3 | 54.7 | 51.7 | 56 | 65 | 75 |  |

ABA = abamectin
hl = hectoliter = 100 liter
DAA = days after application
% Ctrl = % of control, calculated using Abbot's formula.
SL = ABA SL as given for formulation O in Table 3.

TABLE 6

% Ctrl of mobile stages of *Tetranychus urticae* in papaya open field.

| Formulation | Component Rate(s) g of ABA/hl | 5DAA1 | 10DAA1 | 14DAA1 | 21DAA1 | Average |
|---|---|---|---|---|---|---|
| EC (commercial standard) | 0.54 | 88 | 82 | 85 | 53 | 77 |
|  | 1.08 | 90 | 91 | 94 | 74 | 88 |
|  | 1.8 | 94 | 98 | 99 | 88 | 95 |
| SL | 0.27 | 77 | 72 | 77 | 4 | 58 |
|  | 0.54 | 86 | 92 | 97 | 78 | 89 |
|  | 0.81 | 95 | 97 | 98 | 87 | 95 |
|  | 1.08 | 88 | 99 | 99 | 90 | 94 |
|  | 1.8 | 89 | 99 | 99 | 87 | 94 |
| Average number of insects in untreated plot |  | 146 | 224.3 | 348 | 189.9 |  |

ABA = abamectin
hl = hectoliter = 100 liter
DAA = days after application
% Ctrl = % of control, calculated using Abbot's formula.
SL = ABA SL as given for formulation O in Table 3.

Example 4. Efficacy Field Trial Against *Thrips palmi* in Cotton Open Field

Cotton plants were planted in a field in Coimbatore, India and were naturally infested by *Thrips palmi*. Cotton plants were distributed in 20 m² plots (90 cm row spacing and 75 cm within row) with 3 replicates per treatment. Trial design was completely randomized. Two foliar applications were made within 7 days interval when cotton plants were at the vegetative stage of BBCH 19-22.

Water volume spray were 350 and 400 L/ha for the $1^{st}$ and $2^{nd}$ foliar spray respectively. There were ten treatments in total: 1) water-sprayed check, 2) ABA EC at 0.54 g ai/hl, 3) ABA EC at 1.08 g ai/hl, 4) ABA EC at 2.16 g ai/hl, 5) ABA EC at 2.7 g ai/hl, 6) ABA SL at 0.54 g ai/hl, 7) ABA SL at 0.81 g ai/hl, 8) ABA SL at 1.08 g ai/hl and 9) ABA SL at 1.8 gai/hl. Level of efficacy of each treatment was assessed counting the number of number of nymphs and adults stages of *Thrips palmi* on leaves (sample size: 20 leaves per plot). Abbott's formula was used to transform the n° of nymphs and adults into % Ctrl of nymphs and adults. Assessments were done at different days after application (DAA): 3DAA1, 7DAA1, 3DAA2, 7DAA2, 10DAA2, 15DAA2 and 20DAA2. Statistical analysis was done using ANOVA and the Least Significant Difference (LSD) test by Fisher.

Abbot's formula: Corrected % of control=((1−(insect population in treated plot/insect population in untreated plot))*100.

The BBCH-scale is a scale used to identify the phenological development stages of a plant. BBCH officially stands for "Biologische Bundesanstalt, Bundessortenamt and CHemische Industrie".

Results

ABA SL formulation has an improved efficacy (% Ctrl of mobile insect stages) when it's compared to the EC formulation at the same dose rate. Results show ABA SL at 1.08 gai/hl achieved same level of control on damage on plants than 2.16 gai/hl of ABA EC. ABA SL provided 50% dose rate reduction of ABA EC. The results are shown in Table 7.

TABLE 7

% Ctrl of mobile stages of *Thrips palmi* in cotton open field.

| Formulation | Component Rate(s) g of ABA/hl | 3DAA1 | 7DAA1 | 3DAA2 | 7DAA2 | 10DAA2 | 15DAA2 | 20DAA2 | Average |
|---|---|---|---|---|---|---|---|---|---|
| EC (commercial standard) | 0.54 | 67 | 63 | 70 | 67 | 59 | 57 | 45 | 62 |
|  | 1.08 | 82 | 76 | 93 | 88 | 77 | 76 | 64 | 80 |
|  | 2.16 | 88 | 82 | 97 | 90 | 83 | 78 | 66 | 84 |
|  | 2.7 | 100 | 92 | 99 | 94 | 90 | 83 | 70 | 90 |
| SL | 0.27 | 71 | 80 | 87 | 78 | 73 | 69 | 61 | 75 |
|  | 0.54 | 78 | 74 | 92 | 89 | 83 | 79 | 67 | 81 |
|  | 1.08 | 85 | 79 | 96 | 96 | 92 | 85 | 73 | 87 |
|  | 2.16 | 100 | 91 | 100 | 97 | 96 | 88 | 81 | 94 |
|  | 2.7 | 100 | 94 | 100 | 97 | 95 | 89 | 82 | 94 |
| Average number of insects in untreated plot |  | 9.8 | 12.3 | 13 | 14.4 | 17.5 | 19.4 | 18.6 |  |

ABA = abamectin
hl = hectoliter = 100 liter
DAA = days after application
% Ctrl = % of control, calculated using Abbot's formula.
SL = ABA SL as given for formulation O in Table 3.

The invention claimed is:

1. A soluble concentrate composition comprising
   (i) abamectin;
   (ii) polyoxyethylene (20) sorbitan monolaurate;
   (iii) polyoxyethylene (20) sorbitan monooleate;
   wherein the weight ratio of polyoxyethylene (20) sorbitan monolaurate to polyoxyethylene (20) sorbitan monooleate is from 1:2.5 to 15:1.

2. The soluble concentrate composition according to claim 1 comprising
   (i) abamectin;
   (ii) 250-750 grams/liter of the composition of polyoxyethylene (20) sorbitan monolaurate;
   (iii) 50-550 grams/liter of the composition of polyoxyethylene (20) sorbitan monooleate.

3. The soluble concentrate composition according to claim 1 comprising
   (i) abamectin;
   (ii) 250-750 grams/liter of the composition polyoxyethylene (20) sorbitan monolaurate;
   (iii) 50-550 grams/liter of the composition of polyoxyethylene (20) sorbitan monooleate;
   (iv) 150-250 grams/liter of fatty alcohol alkoxylate.

4. The soluble concentrate composition according to claim 1 comprising
   (i) abamectin;
   (ii) 250-350 grams/liter of the composition polyoxyethylene (20) sorbitan monolaurate;
   (iii) 450-550 grams/liter of the composition of polyoxyethylene (20) sorbitan monooleate;
   (iv) 150-250 grams/liter of fatty alcohol alkoxylate.

5. The soluble concentrate composition according to claim 1, wherein the pH of a 1% solution of the composition in deionized water is in the range of 3 to 4.5.

6. The soluble concentrate composition according to claim 1 comprising
   (i) 10-50 grams/liter of the composition of abamectin;
   (ii) 250-350 grams/liter of the composition polyoxyethylene (20) sorbitan monolaurate;
   (iii) 450-550 grams/liter of the composition of polyoxyethylene (20) sorbitan monooleate;
   (iv) 150-250 grams/liter of fatty alcohol alkoxylate; and
   (v) a pH adjusting agent.

7. The soluble concentrate composition according to claim 1, wherein the buffering agent is an anionic phosphate ester.

8. The soluble concentrate composition according to claim 1, wherein the fatty alcohol alkoxylate is ethoxylated or propoxylated or both of them.

9. A method for the preparation of a soluble concentrate composition according to claim 1 comprising the step
   dissolving abamectin in a solution of polyoxyethylene (20) sorbitan monolaurate, polyoxyethylene (20) sorbitan monooleate and fatty alcohol alkoxylate by heating the solution to a temperature of maximum 45° C.

10. The method according to claim 9 comprising the additional step
    cooling the solution back to ambient temperature and then adding a phosphate ester.

11. A method of controlling insect damage in a plant comprising applying a composition according to claim 1 to the plant.

12. The method according to claim 11 wherein the plant is selected from tomato, pepper, potato, banana, eggplant, mango, onion, watermelon, apple, pear, citrus fruit, coffee, oriental melon, cotton, soybean, cucumber, pome fruits, stone fruits, strawberry, curcurbits, melon, pumpkin, squash, cabbage, chilli, okra, papaya and tea.

13. The method according to claim 11 wherein the plant is selected from curcurbits, pepper, tomato, onion, melon, pumpkin, watermelon, citrus fruit, cucumber, eggplant, oriental melon, pear, pome fruits, squash, strawberry, cabbage and chilli.

* * * * *